United States Patent [19]

Peerman et al.

[11] Patent Number: 4,546,120

[45] Date of Patent: Oct. 8, 1985

[54] URETHANE FORMING COMPOSITIONS BASED ON FATTY POLYOLS

[75] Inventors: Dwight E. Peerman, Minnetonka; Edward DiDomenico, Anoka, both of Minn.; Kurt C. Frisch, Grosse Ile, Mich.; Alfred Meffert, Monheim, Fed. Rep. of Germany

[73] Assignee: Henkel Corporation, Minneapolis, Minn.

[21] Appl. No.: 716,014

[22] Filed: Mar. 26, 1985

[51] Int. Cl.$^4$ ............................................. C08G 18/14
[52] U.S. Cl. ..................... 521/159; 521/161; 521/172; 521/174; 521/175; 521/176; 528/60; 528/66; 528/73; 528/74.5; 528/75; 528/76; 528/77
[58] Field of Search ............... 521/159, 161, 172, 174, 521/175, 176; 528/60, 66, 73, 74.5, 75, 76, 77

[56] References Cited

U.S. PATENT DOCUMENTS 2,491,533 12/1949 Swern .................................. 260/61
3,378,531 4/1968 Heins et al. ........................... 528/7
4,299,737 11/1981 Meffert et al. ................... 252/522 I

FOREIGN PATENT DOCUMENTS 1027749 4/1966 United Kingdom .

OTHER PUBLICATIONS

Bilyk et al., *J. American Oil Chem. Soc.*, Aug. 1975, pp 289-292.

*Primary Examiner*—Maurice J. Welsh
*Attorney, Agent, or Firm*—Ernest G. Szoke; Patrick J. Span; J. Daniel Wood

[57] ABSTRACT

Compositions containing an organic polyisocyanate and a fatty polyol are provided. The fatty polyols may be derived from an epoxidized fatty alcohol that has been reacted with a polyfunctional-hydroxy compound. The compositions are preferably salt-free and are useful in preparing a variety polyurethane materials.

20 Claims, No Drawings

URETHANE FORMING COMPOSITIONS BASED ON FATTY POLYOLS

BACKGROUND OF THE INVENTION

1. Technical Field of the Invention

This invention relates to compositions comprised of a polyisocyanate and a fatty polyol selected from a particular class of fatty polyols. More particularly, this invention relates to compositions comprising a polyisocyanate and a fatty polyol which are useful in forming a wide variety of polymeric products having urethane linkages, such as polyurethane elastomers, polyurethane coatings, polyurethane foams, and urethane-modified polyisocyanurate foams.

2. Description of Related Art

Bilyk, et al. reported in the *Journal of American Oil Chemists Society*, August 1975, at pages 289–292, that epoxidized tallow could be treated with trimethylolpropane to prepare a fatty polyol that is useful by reaction with a polyisocyanate to produce a low density rigid polyurethane foam. Bilyk, et al. discloses that the reaction product of trimethylolpropane and epoxidized tallow produces a mixture of mono and diglycerides and esters of trimethylolpropane. Such a mixture, when reacted with a polyisocyanate, will form a polyurethane that has large numbers of glyceride and trimethylolpropane esters that are subject to hydrolysis.

U.S. Pat. No. 3,234,249 to Brack discloses that epoxidized fatty alcohols can be reacted with polycarboxylic acids to form polyhydroxy-polyesters that are useful in the preparation of foams, films, elastomers, and plastics of various degrees of hardness, flexibility, etc., by reacting them with polyisocyanates, anhydrides, dicarboxylic acids, bisepoxides, melamine formaldehyde resins, or urea formaldehyde resins. Brack points out that esterification takes place not only at the epoxide functionality but also at the primary hydroxyl group such that the resultant polyols and the urethanes derived therefrom will have large numbers of hydrolyzable ester linkages.

SUMMARY OF THE INVENTION

This invention relates to compositions which are useful in preparing polymers having urethane linkages comprising at least one organic polyisocyanate compound and at least one fatty polyol of the formula:

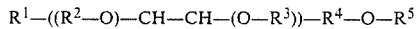

$$R^1-((R^2-O)-CH-CH-(O-R^3))-R^4-O-R^5$$

wherein:

$R^1$ is a monovalent hydrocarbon radical having from 2 to 14 carbon atoms;

$R^2$ and $R^3$ are individually selected from the group of hydrogen, hydroxyl-substituted alkyl radicals, hydroxyl-substituted alkoxyalkyl radicals and hydroxyl-substituted poly(oxyalkylene) radicals, provided that each radical contains from 2 to 32 carbon atoms and from 1 to 9 hydroxyl substituents and, provided further, that at least one of $R^2$ and $R^3$ is other than hydrogen;

$R^4$ is a divalent hydrocarbon radical having from 4 to 14 carbon atoms provided that the sum of the carbon atoms in $R^1$ and $R^4$ must be from 10 to 24; and $R^5$ is selected from the group of hydrogen, hydroxyl-substituted alkyl radicals, hydroxyl-substituted alkoxyalkyl radicals, hydroxyl-substituted poly(oxyalkylene) radicals, provided that each hydroxyl-substituted radical contains from 2 to 32 carbon atoms and from 1 to 9 hydroxyl substituents, and acyl radicals having the structural formula:

$$OC-R^6-((R^7-O)-CH-CH-(O-R^8))-R^9$$

wherein:

$R^6$ is a divalent hydrocarbon radical having from 3 to 13 carbon atoms;

$R^7$ and $R^8$ are individually selected from the group of hydrogen, hydroxyl-substituted alkyl radicals, hydroxyl-substituted alkoxyalkyl radicals and hydroxyl-substituted poly(oxyalkylene) radicals, provided that each radical contains from 2 to 32 carbon atoms and from 1 to 9 hydroxyl substituents and, provided further, that at least one of $R^7$ and $R^8$ is other than hydrogen; and $R^9$ is a monovalent hydrocarbon radical having from 2 to 14 carbon atoms provided that the sum of the carbon atoms in $R^6$ and $R^9$ must be from 9 to 23.

It has been found that these compositions yield a variety of polyurethane materials that have a variety of valuable properties.

Particularly preferred compositions are those which are substantially salt-free.

DETAILED DESCRIPTION OF THE INVENTION

The above structural formula of the fatty polyols contained in the urethane-forming mixtures of this invention encompasses a wide variety of fatty polyols.

The preferred fatty polyols are derived from $C_{16}$–$C_{22}$ fatty alcohols, especially those having a high proportion of oleyl alcohol, which have been epoxidized and subsequently ring-opened with a diol or a triol such as ethylene glycol or trimethylolpropane, i.e. a fatty polyol wherein $R^1$ is a straight-chain alkyl group having 8 carbon atoms, one of $R^2$ and $R^3$ is hydrogen and one is the residue of ethylene glycol (—$CH_2CH_2OH$) or trimethylolpropane (—$CH_2C(CH_2OH)_2CH_2CH_3$), $R^4$ is a straight-chain alkylene radical having 8 carbon atoms, and $R^5$ is hydrogen. The preferred monovalent hydrocarbon radicals for $R^1$ and $R^9$ are straight chain alkyl and alkenyl radicals. The preferred divalent hydrocarbon radicals for $R^4$ and $R^6$ are straight chain alkylene and alkenylene radicals. By selecting among the various available naturally occurring and synthetic fatty alcohols, it is possible to obtain, by the processes described hereinafter, fatty polyols having the above structure which are useful in the present invention.

The fatty polyols useful in this invention can be obtained by epoxidizing unsaturated $C_{12}$–$C_{26}$ fatty alcohols or unsaturated $C_{12}$–$C_{26}$ fatty alcohol esters of $C_{12}$–$C_{26}$ unsaturated fatty acids which are then reacted with polyfunctional hydroxy-compounds containing from 2 to 10 —OH groups, with opening of the epoxide rings. If desired, this reaction product is subsequently reacted with an alkylene oxide.

The opening of the epoxide ring of the epoxidized fatty alcohols is generally catalyzed with a strong acid or base which is subsequently neutralized to form a salt, prior to reaction with an organic polyisocyanate. It has been found that the salt from the neutralization of the ring-opening catalyst may catalyze the reaction of the fatty polyol with a polyisocyanate to an unknown degree. Thus, salt-containing fatty polyols have unpredictable reaction rates with polyisocyanates. It is therefore preferable to remove substantially all of the salt from the fatty polyol to produce substantially salt-free fatty polyol, which can be reacted with a polyisocyanate in the presence of a measured amount of a known catalyst which will predictably catalyze the reaction.

The fatty polyols useful in this invention are chemical compounds derived predominantly from renewable raw materials. They are derived from triglycerides, i.e. fatty oils, of vegetable, animal or marine animal origin or from the free fatty acids e.g. tall oil fatty acids.

It is known that triglycerides can be reacted, for example, to form methyl esters which can be catalytically reduced to alcohols of the type known as fatty alcohols. Fatty alcohols are understood to be primary monofunctional alcohols which are derived from fatty acid derivatives. Fatty alcohols obtainable on an industrial scale or not pure chemical substances, but are mixtures of alcohols of different chain lengths which contain between 0 and 3 double bonds. The composition of the fatty alcohol mixtures depends upon the nature of the triglyceride from which they have been obtained. However, it is possible to enrich individual fatty alcohols in the mixtures by extraction, fractional crystallization, or distillation, or to produce fatty alcohols from fatty acid fractions which have already been pretreated in this way.

When used herein, the term "fatty alcohol" means one or a mixture of two or more unsaturated alcohols having the structural formula:

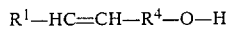

$R^1$—HC=CH—$R^4$—O—H wherein, $R^1$ and $R^4$ are as previously defined, often in admixture with at least one saturated alcohol. The most common unsaturated constituents of fatty alcohols are:
  $C_{16}$: palmitoleyl alcohol
  $C_{18}$: oleyl alcohol, elaidyl alcohol, linoleyl alcohol, linolenyl alcohol
  $C_{20}$: gadoleyl alcohol, arachidonic alcohol
  $C_{22}$: erucic alcohol, brassidyl alcohol Fatty alcohols containing one or more of these constituents in large or predominant quantities can be epoxidized by known methods, for example, using peracids, such as peracetic acid. The epoxidation of monounsaturated fatty alcohols may be carried out with high conversions, for example of from 80 to 100 mole percent. In the case of polyunsaturated alcohols, it is only the first double bond which is quantitatively epoxidized. The epoxidation of other double bonds requires severe reaction conditions.

Epoxidized fatty alcohols containing from 30 to 100 mole percent of epoxide groups and preferably from 70 to 95 mole percent of epoxide groups, based on the double bonds originally present, are used for the production of the fatty polyols useful in this invention. Epoxidized fatty alcohols based on fatty alcohols having iodine numbers of from 20 to 170 can be used herein. Suitable epoxidized fatty alcohols are derived, for example, from the following fatty alcohols:

(1) tallow alcohol having an iodine number of from 50 to 55 and containing saturated $C_{12}$-$C_{26}$ alcohols, produced from tallow fatty acid esters;

(2) tallow alcohol having an iodine number of from 80 to 85 produced from tallow fatty acid esters in which the unsaturated fractions have been enriched by preferential wetting;

(3) tallow alcohol having an iodine number of from 92 to 96 produced from tallow alcohol having an iodine number of from 80 to 85 by crystallizing out and separating off saturated fractions (approximately 90% of the resulting product consists of oleyl alcohol);

(4) soy alcohol having an iodine number of from 110 to 130 produced from soy fatty acid and containing approximately 30% oleyl alcohol, approximately 40% linoleyl alcohol and approximately 7% linolenyl alcohol;

(5) rape oil alcohol having an iodine number of from 90 to 100 and containing approximately 50% by weight of erucic alcohol;

(6) and also from fatty alcohols based on tall oil fatty acid, palm oil fatty acid, linseed oil fatty acid, peanut oil fatty acid, and cottonseed oil fatty acid.

Where the starting material used is a fatty alcohol having an iodine number of from 50 to 55, an epoxide number of from 2.5 to 2.7% by weight of epoxide oxygen is attained after epoxidation.

Fatty alcohols having iodine numbers of from 110 to 130 can be epoxidized up to an epoxide number of approximately 5% by weight of epoxide oxygen, leaving a residual iodine number of from 2 to 30.

The epoxidized fatty alcohols or fatty esters are subjected to a catalytic ring-opening reaction with at least one polyfunctional-hydroxy compound having the structural formula $R^2$—OH or $R^3$—OH, wherein $R^2$ and $R^3$ are as defined previously, with the exception that they may not be hydrogen. Suitable polyfunctional-hydroxy compounds include ethylene glycol and trimethylolpropane.

Because a "fatty polyol" as defined above, is also a "polyfunctional-hydroxy compound", either of $R^2$ or $R^3$ and either of $R^7$ and $R^8$ may be a hydroxyl-substituted alkoxyalkyl radical which is also the residue of a fatty polyol as defined above. For example, any of the hydroxyl groups of 9(10)-(2-hydroxyethyl)-10(9)-hydroxyoctadecanol, a fatty polyol as defined above, can ring open the epoxide group of epoxidized oleyl alcohol to prepare a fatty polyol wherein $R^2$ or $R^3$ is the residue of 9(10)-(2-hydroxyethyl)-10(9)-hydroxyoctadecanol.

For acid-catalyzed ring-opening, it is preferred initially to introduce the polyfunctional-hydroxy component and catalytic quantities of an acid, for example sulfuric acid, phosphoric acid, p-toluenesulfonic acid or acid ion exchangers, into the reaction vessel and then to add the epoxidized fatty alcohol in portions at temperatures in the range of from about 50° to about 130° C. and preferably at temperatures in the range of from about 70° to about 100° C.

The course of the reaction may be followed by gas chromatography or even by titration of the residual epoxide oxygen. The epoxidized fatty alcohol is quantitatively reacted after reaction times of from about 2 to about 6 hours and preferably of from about 3 to about 5 hours, depending on the size of the batch and the addition rate. At the end of the reaction, the acid catalyst can be neutralized by suitable bases. Readily volatile constituents, such as for example, unreacted polyfunctional-hydroxy compounds or even saturated or unsaturated non-epoxidized fatty alcohols, can be distilled off in vacuo.

Acid catalysis is preferred for use in the above process wherein epoxidized fatty alcohols are reacted with polyfunctional aliphatic alcohols. Other variants of the process can also be used for carrying out the acid-catalyzed ring-opening reaction. Thus, all the starting materials can be simultaneously introduced into the reaction vessel or, alternatively, either the polyfunctional hydroxy component or the epoxidized fatty alcohol can be added incrementally.

The preferred method of obtaining the fatty polyols of this invention wherein $R^5$ is an acyl group, as defined above, is to esterify an unsaturated fatty alcohol with an unsaturated fatty acid, then epoxidize the unsaturation in the resulting ester and ring-open with the desired polyfunctional hydroxy compound selected from the group of $R^2$, $R^3$, $R^7$ and $R^8$. The product of this procedure will produce a fatty polyol wherein $R^2$ and $R^3$ will be the same as $R^7$ and $R^8$, but not necessarily respectively.

The fatty polyols useful in this invention wherein $R^2$, $R^3$, $R^7$ or $R^8$ is an hydroxyl-substituted alkoxylalkyl radical or an hydroxyl-substituted poly(oxyalkylene) radical are obtained by reacting the ring-opened fatty polyols with alkylene oxides. It is possible to react the fatty polyols useful in this invention with alkylene oxides such as ethylene oxide, propylene oxide, glycidyl ethers and the like to modify water solubility and viscosity and to provide greater flexibility in the polyurethane product.

The other necessary component of the compositions of this invention is at least one organic polyisocyanate compound.

Suitable organic polyisocyanate include ethylene diisocyanate, trimethylene diisocyanate, hexamethylene diisocyanate, propylene-1,2-diisocyanate, ethylidene diisocyanate, cyclopentylene-1,3-diisocyanate, the 1,2-, 1,3- and 1,4-cyclohexylene diisocyanates, the 1,3- and 1,4-phenylene diisocyanates, polymethylene polyphenylene-isocyanates, the 2,4- and 2,6-tolylene diisocyanates, the 1,3- and 1,4-xylylene diisocyanates, bis(4-isocyanatophenyl)methane, 4,4'-diphenyl-propane diisocyanates, bis(2-isocyanatoethyl) carbonate, 1,8-diisocyanato-p-menthane, 1-methyl-2,4-diisocyanatocyclohexane, the chlorophenylene diisocyanates, naphthalene-1,5-diisocyanate triphenylmethane-4,4',4"-triisocyanate, isopropylbenzene-alpha-4-diisocyanate, 5,6-bicyclo[2.2.1]hept-2-ene diisocyanate, 5,6-diisocyanatobutylbicyclo [2.2.1]hept-2-ene and similar polyisocyanates.

Also of use in the present invention are trimethylene hexamethyl diisocyanate available from VEBA, hepatadecyl (C17) diisocyanate, DDI 1410 an aliphatic C-36 diisocyanate available from the Henkel Corporation of Minneapolis, Minn. and polymethylene polyphenyl isocyanates such as PAPI 135 available from Upjohn. Tolylene diisocyanate available from Allied Chemical, isophorone diisocyanate available from VEBA are particularly useful. When the composition is to be cured to form a coating, polyisocyanate prepolymers, or adducts of organic polyisocyanate compounds, such as Desmodur N, an aliphatic triisocyanate available from Mobay can be used. Desmodur N is more particularly defined as the tri-isocyanate adduct of 3 moles of hexamethylene diisocyanate and water having an isocyanate equivalent weight as later defined in 191 grams. Other adducts or prepolymers of the polyisocyanate include Mobay's Z4370 and Mobay's Mondur CB which are the isocyanurate prepolymer of isphorone diisocyanate and the trimethylol propane prepolymer of toluene diisocyanate, respectively.

The particular ratio of the polyisocyanate to fatty polyol utilized in forming the urethane-forming compositions of the present invention will depend upon the particular use for which the composition is desired. When the urethane-forming composition is to be cured to form an elastomer, coating, urethane foam, or adhesive, the ratio is chosen such that each hydroxy functional group on the alcohol will react on a 1:1 stoichiometric basis with the isocyanate functionality of the polyisocyanate compound. It is quite feasible, however, to form the urethane foams, elastomers, coatings and adhesives using from about 80% to 120%, preferably from about 95% to 105% on a hydroxyl-isocyanate equivalent basis of the polyisocyanate to form the urethane product. When the urethane-forming composition is to be cured to form a urethane-modified isocyanurate foam, an excess of polyisocyanate should be used generally ranging from about a 1.5:1 equivalents ratio of isocyanate to fatty polyol up to about a 30:1 ratio.

To determine the amount of the polyisocyanate required for a given mixture with a given fatty polyol, the hydroxyl or isocyanate equivalent weight of the respective polyol or polyisocyanate is determined as that weight in grams of the material which contains 1 gram equivalent weight of the respective functional group. More particularly to determine the number of equivalents in a given polyol the hydroxyl value is first determined by known methods and reported in milligrams of potassium hydroxide equivalent to the hydroxyl content of 1 gram of sample. The calculation to determine the hydroxyl equivalent weight is then given by the following equation:

OH equivalent weight $$\text{OH equivalent weight} = \frac{56,100}{\text{OH value}}$$

wherein 56,100 is the milligram equivalent weight of potassium hydroxide.

Alternatively if the weight percentage of the hydroxyl groups in the polyol is known, the hydroxyl equivalent is determined as follows:

OH equivalent weight $$\text{OH equivalent weight} = \frac{17 \times 100}{\text{wt \% OH}}$$

where 17 is the equivalent weight of the hydroxyl radical and the weight percent OH is the percent OH is the percentage of the polyol which is hydroxyl groups.

In similar fashion the isocyanate equivalent may be determined if the weight percent of the isocyanate functional groups in the polyisocyanate is known. This equation is given below where 42 is the molecular weight of an isocyanate functional group and the weight percent NCO is that portion of polyisocyanate made up of isocyanate functional groups.

$$\text{isocyanate equivalent weight} = \frac{42 \times 100}{\text{wt \% NCO}}$$

To form the urethane-forming compositions the fatty polyol and the organic polyisocyanate are merely mixed together in the proper proportions. When utilized as a coating the compositions are then quickly spread with a knife, blade, brush or spray over the surface of the article to be coated. Where molded articles are desired various techniques such as reaction injection molding may be used. When used to form a urethane-modified isocyanurate foam, the compositions of this invention are mixed with a surfactant, a blowing agent and a trimerization catalyst to catalyze the formation of isocyanurate linkages in the polyurethane product. Specific techniques for forming urethane reaction products are hereinafter described in the examples.

If desired, various urethane catalysts may be employed to promote the reaction. Examples of such urethane catalysts include triethylene diamine, morpholine, N-ethylmorpholine, dimethyl piperazine, triethylamine, N,N,N',N'tetramethylbutane-1,3-diamine, dibutyltin dilaurate, stannous octoate, stannous laurate, dioctyltin diacetate, lead octoate, stannous oleate, stannous tallate, dibutyltin oxide, and hexabutylditin as well as other art recognized urethane catalysts. Typical levels of the urethane catalyst are from about 0.001% to about 5% by weight of the urethane linking components.

Additional polyols may be included with the fatty polyols. Additional polyols are especially desirable in compositions to be used to form elastomers to modify the rigidity of the resulting elastomers. Such polyols may be an alkyl or cycloalkyl polyol, an ester linked polyol, an ether linked polyol, an ether and ester linked polyol or hydroxy functional acrylic copolymers.

Specific examples of alkyl and cycloalkyl polyols include ethylene glycol, 1,4-butanediol, 2,5-hexanediol, available from Aldrich Chemical, 1,6-hexanediol, available from Celanese Chemical, Dimerol a 36 carbon essentially linear diol available from Henkel Corporation, glycerol, 1,2,6-hexanetriol available from Union Carbide, pentaerythritol, and 1,4-cyclohexanediol. Additional examples of such polyols include Polybd R-45HT, a polybutadiene diol having an approximate molecular weight of 2800 available from Arco and trimethylolpropane available from Celanese. Especially suitable are the alkanediols having from 2 to 6 aliphatic carbon atoms. Also useful are polytetramethylene ether glycols such as Teracol 1000 and Teracol 2000 available from Dupont having molecular weights of 1000 and 2000 g/mole, respectively, polyoxypropylene derivatives of propylene glycol such as Pluracol 410 and Pluracol 710 available from BASF-Wyandotte and having molecular weights of 425 and 775 g/mole, respectively, polyoxypropylene derivatives of trimethylolpropane such as Pluracol TP-440, available from BASF-Wyandotte and having a molecular weight of 425 g/mole and polycaprolactone diols such as Niax PCP-0240, available from Union Carbide with a molecular weight of 2000 g/mole.

EXAMPLES

The following examples illustrate the wide variety of uses that can be made of the compositions of the present invention.

A. STARTING MATERIALS

The fatty polyols useful in the compositions of the present invention are prepared by ring-opening epoxidized fatty alcohols or esters. Examples of epoxidized fatty alcohols are described in subsection 1 below. Examples of the fatty polyols useful in this invention are described in subsection 2 below. The use of fatty polyols to form various polyurethane products is described in subsections B-E below.

1. Epoxidized Fatty Alcohols

The properties of the epoxidized fatty alcohols used in the following examples are shown in Table I. These epoxidized fatty alcohols are prepared by a known method, i.e., by the method described by D. Swern et al., in J. Am. Chem. Soc. 66, 1925 (1944). Other known methods can also be employed for their preparation.

TABLE I

| EPOXIDIZED FATTY ALCOHOL | COMPOSITION | | | | | | EPOXIDE NUMBER (MOLE % OF EPOXIDE OXYGEN) | HYDROXYL NUMBER mg OF KOH/g | STARTING IODINE NUMBER mg OF I/g |
|---|---|---|---|---|---|---|---|---|---|
| | $C_{10}$ | $C_{12}$ | $C_{14}$ | $C_{16}$ | $C_{18}$ | $C_{20}$ | | | |
| A | 0 | 0–2 | 2–7 | 25–35 | 55–75 | 0–2 | 2.5–2.7 | 210–220 | 50–55 |
| B | 0 | 0–2 | 2–7 | 8–18 | 70–83 | 0–3 | 4.1–4.3 | 209–219 | 84–89 |
| C | 0 | 0 | 0 | 2–9 | 90–97 | 0–2 | 4.4–4.7 | 200–210 | 92–96 |
| D | 0 | 0 | 0 | 5–10 | 90–95 | 0–2 | 4.3–4.8 | 200–220 | 110–130 |

2. Production of Fatty Polyols

Initially, the hydroxyl group-containing compound is introduced, followed by the addition of 0.1 to 0.5 g of sulfuric acid per mole of epoxidized fatty alcohol to be reacted. After heating to 70°–100° C., the epoxidized fatty alcohol is added in molten form. The end of the reaction (in the case of 1 kg laboratory batches, after 3 hours) is determined by gas chromatography. The sulfuric acid is neutralized with sodium methylate and unreacted alcohols are distilled off in vacuo. The reaction of the epoxide groups is quantitative.

The starting materials used and the characteristics of the polyol-containing mixtures thus obtained are listed in Table II.

TABLE II

| Characteristics of the Fatty Polyols | | | | |
|---|---|---|---|---|
| Fatty Polyol No. | Epoxized Fatty Alcohol | Hydroxy Compound | Molar Ratio Epox. Fatty Alcohol To Hydroxy Comp. | —OH number (mg of KOH/g) |
| 1 | A | ethylene glycol | 1:3 | 386.5 |
| 2 | A | ethylene glycol | 1:1 | 326.2 |
| 3 | A | ethylene glycol | 2:1 | 292.3 |
| 4 | C | ethylene glycol | 1:3 | 407.5 |
| 5 | C | ethylene glycol | 1:1 | 347.3 |
| 6 | C | ethylene glycol | 2:1 | 296.1 |
| 7 | C | trimethylolpropane | 1:3 | |

B. URETHANE ELASTOMERS

Urethane elastomers from the fatty polyols useful in this invention have excellent compatibility with a wide range of co-polyols and polyisocyanates. Without the addition of co-polyols they form hard urethane products of useful properties, especially outstanding resistance to water and hydrolytic degradation. When modified by the addition of appropriate short-chain and/or long-chain co-polyols they form urethane elastomers with an excellent balance of properties notable among which are hydrolytic stability and elasticity at low temperatures.

In reacting the fatty polyol or blended polyols with a polyisocyanate the following standard procedure was used. The polyol or polyol blend was first degassed by heating to 60°-80° C. with stirring under a vacuum of 0.1-5.0 mmHg for about 1-3 hours. The polyol was then cooled to 20°-30° C. and a catalyst, typically a tin-containing compound such as dibutyltin dilaurate, was added when necessary. The reactive polyisocyanate was added with stirring and briefly degassed under vacuum for a period seldom over 10 minutes. During this period the exothermic reaction caused the temperature, and ultimately the viscosity, to rise and the product was quickly poured into prepared molds. Curing was done at 100°-110° C. for 1 to 16 hours, the time to gel being noted. Cured specimens were aged 5-7 days at 23° C., 50% R.H., before evaluation.

The fatty polyols useful in this invention were used in four different formulations: (a) with a diisocyanate but without a co-polyol to form hard urethane castings; (b) with a long-chain co-polyol to form softer urethane elastomers; (c) with both long and short-chain co-polyols to obtain segmented cast elastomers; and (d) with polyfunctional copolyols to obtain reaction injection molding (RIM) products.

1. Hard, Cast Urethanes Prepared Without a Co-Polyol

In Table III below, Fatty Polyols 1 through 6 were reacted with three different diisocyanates. NCO-A is a carbodiimide liquid modification of bis(4-isocyanatophenyl)methane available from Upjohn as Isonate 143L. NCO-B is 3-isocyanatomethyl-3,5,5-trimethylcyclohexylisocyanate. NCO-C is an 80:20 mixture by weight of the 2,4- and 2,6-isomers of tolylenediisocyanate. The amount of diisocyanate was sufficient to provide a slight equivalent excess of diisocyanate compound. Catalyst A is dibutyltin dilaurate, added in an amount of 0.1% based on the weight of the reactants. The reactivity of the polyols with the diisocyanate is represented in the following table by the symbols S for Slow, M for Moderate, F or Fast, and BF for Very Fast. The following tests were used to obtain the data displayed in Table III below.

| TESTS USED FOR HARD, CAST ELASTOMERIC URETHANES | |
|---|---|
| Hardness (Shore D) | by ASTM D-2240 |
| Tensile Properties | by ASTM D-638 |
| Flexural Modulus | by ASTM D-790 |
| Water Absorption, 70° C. | by ASTM D-570 |
| Izod Impact | by ASTM D-256 |

Hydrolytic Resistance

The purpose of this test is to determine the permanent effect of hydrolysis on the tensile strength of an elastomer. Tensile specimens were held in a rack in a pressure vessel for 18 hours at 125° C. (14 psi) steam. The samples were removed, dried 48 hours over desiccant, conditioned 48 hours at 23° C., 50% R.H. and tested for tensile strength. The tensile strength after testing was computed as a percentage of that before testing and the result designated percentage retained tensile strength.

Heat Sag Test

The purpose of this test is to determine whether structural panels of the plastic to be tested will remain free of distortion after exposure to automotive paint baking ovens. The lower the amount of sag the more likely the panel will survive baking free of distortion.

Specimens of the panel 5×1 inch by the nominal thickness were clamped in a fixture with 4 inches overhang. After 5 minutes at 23° C. the distance between the end of the specimen and the baseline was measured. The fixture and specimens were then placed in an oven at 120° C. for 1 hour. After removing from the oven the distance from the end of the specimen to the baseline was again measured. The amount of specimen sag toward the baseline is recorded.

TABLE III

A COMPARISON OF PROPERTIES OF URETHANE CASTINGS OF FATTY POLYOLS WITH THREE DIISOCYANANTES

| EXAMPLE | NCO | FATTY POLYOL NO. | REACTIVITY WITH NCO | CATALYST | SHORE HARDNESS D | ULTIMATE STRENGTH (psi) |
|---|---|---|---|---|---|---|
| 1 | A | 1 | F | NONE | 78 | 7950 |
| 2 | A | 2 | M | NONE | 75 | 7750 |
| 3 | A | 3 | M | NONE | 73 | 6690 |
| 4 | A | 4 | F | NONE | 78 | 9250 |
| 5 | A | 5 | F | NONE | 77 | 8120 |
| 6 | A | 6 | F | NONE | 75 | 5710 |
| 7 | B | 1 | S | A | 77 | 8160 |
| 8 | B | 2 | S | A | 75 | 7430 |
| 9 | B | 3 | S | A | 71 | 5450 |
| 10 | B | 4 | S | A | 80 | 8480 |
| 11 | B | 5 | S | A | 78 | 7120 |
| 12 | B | 6 | S | A | 73 | 6270 |
| 13 | C | 1 | VF | NONE | 77 | 8890 |
| 14 | C | 2 | VF | NONE | 72 | 6700 |
| 15 | C | 3 | VF | NONE | 68 | 4700 |
| 16 | C | 4 | VF | NONE | 77 | 8960 |
| 17 | C | 5 | VF | NONE | 75 | 7650 |
| 18 | C | 6 | VF | NONE | 76 | 7400 |

| EXAMPLE | ELONGATION (%) | NOTCHED IZOD IMPACT (Ft-Lb/in) | FLEXURAL MODULUS 25° C. (×10⁴) | HEAT SAG (120 C.) | H₂O ABSOR. 70° C. 24 hr (wt %) | % RETAINED TENSILE AFTER HYDROLYSIS |
|---|---|---|---|---|---|---|
| 1 | 9 | 0.78 | 24.3 | 0.6 | 0.69 | 100 |
| 2 | 13 | 0.64 | 19.2 | 0.9 | 0.80 | 95 |
| 3 | 11 | 0.93 | 17.4 | 1.2 | 0.83 | 97 |
| 4 | 9 | 0.36 | 25.9 | 0.6 | 0.64 | 92 |

TABLE III-continued
A COMPARISON OF PROPERTIES OF URETHANE CASTINGS OF FATTY POLYOLS WITH THREE DIISOCYANANTES

| 5  | 9  | 0.53 | 24.6 | 0.9 | 0.78 | 100 |
| 6  | 7  | 0.64 | 21.4 | 1.1 | 0.83 | 100 |
| 7  | 8  | 0.36 | 25.9 | 1.2 | 1.37 | 100 |
| 8  | 10 | 0.32 | 19.7 | 1.1 | 1.38 | 91  |
| 9  | 14 | 0.99 | 11.1 | 1.2 | 1.34 | 80  |
| 10 | 6  | 0.40 | 26.4 | 1.2 | 1.30 | 89  |
| 11 | 6  | 0.30 | 23.2 | 1.0 | 1.19 | 100 |
| 12 | 10 | 0.40 | 13.6 | 1.1 | 1.42 | 100 |
| 13 | 12 | 0.37 | 22.7 | 1.5 | 1.17 | 90  |
| 14 | 10 | 0.76 | 16.0 | 1.0 | 1.17 | 92  |
| 15 | 15 | 0.91 | 9.4  | 1.3 | 1.19 | 76  |
| 16 | 9  | 0.49 | 24.4 | 0.7 | 0.99 | 66  |
| 17 | 10 | 0.42 | 20.0 | 0.7 | 0.89 | 98  |
| 18 | 7  | 0.43 | 21.3 | 1.2 | 1.18 | 72  |

Table III shows that representative compositions of this invention can be used to prepare urethanes having useful properties. The fatty polyols useful in this invention are unusual in that they form urethanes with useful hardness and strength when reacted as the sole polyol with a diisocyanate without other modifying polyols. Most polyols on the market require modifying co-polyols to place them in a useful hardness range. One reason for this is the intermediate molecular weight of the fatty polyols and lack of other polar groups which influence properties. For example, 1,4-butanediol reacted with NCO-A gives a reaction product which is very hard but brittle to the point where it is useless. Polyether or polyester glycols in the molecular weight range of 400–2000 are too soft and cheesy when reacted with NCO-A. All these polyols require modifying with their counterparts in hard (short-chain) segment or soft segment (long-chain) polyols to make them useful. Fatty polyols alone with NCO-A are near the hard end of the scale but may be softened with ether or ester diols or hardened even further with short-chain diols such as 1,4-butanediol or ethylene glycol.

2. Soft Cast Urethanes With Long-Chain Co-Polyols

Fatty Polyols 1 through 6 were formulated with NCO-A and a long-chain polytetramethylene ether glycol having a molecular weight of about 2,000 grams/mole, designated as copolyol-A, available from DuPont as Teracol 2000. The weight percent of the two polyols and the diisocyanate as well as the hydroxyl equivalents of the fatty polyol to the co-polyol are shown in Table IV below. The data shown in Table IV below was collected using the tests indicated below.

| | |
|---|---|
| Hardness (Shore A) | by ASTM D-2240 |
| Tensile Properties | by ASTM D-412 |
| Set After Break (S.A.B.) | by ASTM D-412 |
| Split Tear (S.T.) (Tear Propagation Resistance | by ASTM D-1938 |
| Compression Set (C.S.) | by ASTM D-395 |
| Water Absorption, 70° C. | by ASTM D-570 |
| Torsional Modulus | by ASTM D-1043 |
| Izod Impact | by ASTM D-256 |

Hydrolytic Resistance

The purpose of this test is to determine the permanent effect of hydrolysis on the tensile strength of an elastomer. Tensile specimens were immersed in deionized water at 70° C. for 24 hours. They were dried 48 hours over desiccant, conditioned 48 hours at 23° C., 50% R.H. and then tested for tensile strength. The tensile strength after testing is computed as a percentage of that before and the result designated percentage retained tensile strength.

TABLE IV
SOFTER CAST ELASTOMERS FROM FATTY POLYOLS AND LONG-CHAIN CO-POLYMERS

| EXAMPLE | NCO-A (WT %) | COPOL-YOL-A (WT %) | FATTY POLYOL NO. | FATTY POLYOL (WT %) | EQUIVALENT RATIO OF FP/CP | HARDNESS SHORE A | MAXIMUM TENSILE STRENGTH (psi) |
|---|---|---|---|---|---|---|---|
| 19 | 37 | 32 | 4 | 31 | 8/1   | 98 | 2538 |
| 20 | 34 | 33 | 5 | 33 | 7/1   | 93 | 1908 |
| 21 | 31 | 34 | 6 | 35 | 6/1   | 84 | 1160 |
| 22 | 36 | 32 | 1 | 32 | 8/1   | 97 | 2617 |
| 23 | 32 | 34 | 2 | 34 | 7/1   | 86 | 1505 |
| 24 | 30 | 35 | 3 | 35 | 6/1   | 78 | 946  |
| 25 | 34 | 40 | 4 | 26 | 6/1   | 90 | 1501 |
| 26 | 34 | 33 | 5 | 33 | 7/1   | 93 | 1903 |
| 27 | 31 | 34 | 6 | 35 | 6/1   | 84 | 1160 |
| 28 | 33 | 39 | 1 | 28 | 5.5/1 | 90 | 1614 |
| 29 | 32 | 34 | 2 | 34 | 6.6/1 | 86 | 1505 |
| 30 | 33 | 28 | 3 | 39 | 8/1   | 88 | 1427 |

| EXAMPLE | E (%) | S.A.B. (%) | S.T. (PLI) | C.S. (%) | NOTCHED IZOD (ft-lb/in) | HYDROLYTIC $H_2O$ ABSORPTION 70° C., 24 hrs (%) | STABILITY RETAINED TENSILE (%) | TORSIONAL RIGIDITY $T_f(°C.)T_4$ |
|---|---|---|---|---|---|---|---|---|
| 19 | 69  | 4 | 96 | 29 | 2.3 | 1.4 | 75  | −24 | 28 |
| 20 | 98  | 0 | 58 | 26 | 2.9 | 1.5 | 100 | −29 | 14 |
| 21 | 109 | 0 | 34 | 32 | 4.0 | 1.5 | 82  | −43 | 3  |

TABLE IV-continued

SOFTER CAST ELASTOMERS FROM FATTY POLYOLS AND LONG-CHAIN CO-POLYMERS

| 22 | 79  | 4 | 90 | 29 | 2.5 | 1.4 | 91  | −23 | 26 |
| 23 | 136 | 0 | 44 | 18 | 5.5 | 1.5 | 76  | −39 | 7  |
| 24 | 128 | 1 | 26 | 12 | 4.4 | 1.4 | 96  | −38 | −2 |
| 25 | 85  | 1 | 41 | 23 | 4.4 | 1.2 | 90  | −37 | 10 |
| 26 | 98  | 0 | 58 | 26 | 2.9 | 1.5 | 100 | −29 | 14 |
| 27 | 109 | 0 | 34 | 32 | 4.0 | 1.5 | 82  | −43 | 3  |
| 28 | 119 | 0 | 50 | 19 | 4.8 | 1.6 | 82  | −39 | 8  |
| 29 | 136 | 0 | 44 | 18 | 5.5 | 1.5 | 76  | −39 | 7  |
| 30 | 134 | 1 | 49 | 14 | 5.4 | 1.5 | 100 | −32 | 8  |

3. Segmented Cast Elastomers

In Examples 31–41, Fatty Polyols 1 through 6 were formulated with NCO-A, a short-chain diol, 1,4-butanediol (copolyol-B), and several long-chain polyols in addition to copolyol-A. Copolyol-C is similar to copolyol-A in that it is a polyoxytetramethylene ether available from DuPont but the molecular weight is about 1,000 grams/mole and it is sold as Teracol 1000. Copolyol-D is a polycaprolactone diol having a molecular weight of about 2,000 grams/mole available from Union Carbide as Niax PCP-0240.

The tests used to obtain the data shown in Table V below were the same as those used in Examples 19–30, described in subsection 2, above.

which retain torsional moduli to a relatively low average temperature.

4. Reaction Injection Molded Elastomers

In Examples 42–45, Fatty Polyol 1 was formulated with copolyol-E, a commercial copolyol used in formulating commercial RIM products which is a stable dispersion of polyacrylonitrile in a trifunctional polyalkylene oxide available from Union Carbide as Niax 31-28. Example 46 was formulated with Fatty Polyol 7. The RIM formulations were made with NCO-A, NCO-D, which is a modified bis(4-isocyanatophenyl)methane (MDI) of medium viscosity containing a high percentage of MDI available from Upjohn as Isonate 181 and NCO-E, a modified MDI specifically designed for high

TABLE V

CAST, SEGMENTED URETHANE ELASTOMERS FROM FATTY POLYOLS, A SHORT-CHAIN COPOLYOL AND LONG-CHAIN COPOLYOL

| EXAMPLE | NCO-A (WT %) | SHORT CHAIN COPOLYOL-B (WT %) | LONG CHAIN COPOLYOL | LCP (WT %) | FATTY POLYOL NO. | FATTY POLYOL (WT %) | RATIO OF EQUIVALENTS OF FP/SCP/LCP | HARDNESS SHORE A |
|---|---|---|---|---|---|---|---|---|
| 31 | 35   | 2.1 | A | 43   | 4 | 21   | 16/5/4 | 92 |
| 32 | 35   | 2.3 | A | 38   | 5 | 24   | 9/3/1  | 90 |
| 33 | 34   | 2.1 | A | 35   | 6 | 29   | 10/3/2 | 90 |
| 34 | 39   | 1.7 | C | 39   | 4 | 20   | 4/1/2  | 93 |
| 35 | 36   | 1.8 | D | 41   | 4 | 22   | 4/1/1  | 96 |
| 36 | 39   | 2.4 | C | 36   | 5 | 23   | 8/3/4  | 95 |
| 37 | 38   | 2.6 | C | 34   | 6 | 25   | 16/7/8 | 93 |
| 38 | 40   | 2.4 | C | 37   | 1 | 21   | 6/2/3  | 94 |
| 39 | 39   | 2.6 | C | 35   | 2 | 24   | 7/5/6  | 93 |
| 40 | 39   | 2.7 | C | 31   | 3 | 27   | 7/3/3  | 94 |
| 41 | 39.6 | 1.7 | C | 39.8 | 7 | 18.9 | 4/1/2  | 98 |

| EXAMPLE | MAXIMUM TENSILE STRENGTH psi | E % | S.A.B. % | S.T. PLI | C.S. % | NOTCHED IZOD (ft-lb/in) | H₂O ABSORPTION 70° C., 24 hrs % | HYDROLYTIC STABILITY RETAINED TENSILE. % | TORSIONAL RIGIDITY $T_f$ | $T_4$ |
|---|---|---|---|---|---|---|---|---|---|---|
| 31 | 1850 | 95  | 5 | 50  | 23 | 4.9 | 1.5 | 75 | −39 | 9  |
| 32 | 1365 | 90  | 5 | 60  | 30 | 5.0 | 1.5 | 82 | −38 | 8  |
| 33 | 1366 | 95  | 9 | 47  | 31 | 4.6 | 1.5 | 69 | −37 | 6  |
| 34 | 2735 | 120 | 2 | 82  | 22 | 7.0 | 1.4 | 67 | −22 | 13 |
| 35 | 2716 | 115 | 1 | 123 | 21 | —   | 1.6 | 58 | −9  | 16 |
| 36 | 2811 | 120 | 3 | 111 | 19 | 5.3 | 2.0 | 58 | −17 | 16 |
| 37 | 2286 | 100 | 0 | 82  | 23 | 5.8 | 1.5 | 62 | −20 | 14 |
| 38 | 2645 | 130 | 3 | 108 | 10 | 9.4 | 1.6 | 80 | −19 | 14 |
| 39 | 2508 | 138 | 3 | 84  | 5  | 9.5 | 1.8 | 87 | −19 | 13 |
| 40 | 2650 | 140 | 2 | 120 | 8  | 8.3 | 1.6 | 82 | −20 | 15 |
| 41 | 3120 | 80  | 0 | 120 | 16 | —   | 1.7 | 81 | —   | —  |

The results in Table V above demonstrate that representative compositions of this invention can be used to form urethane elastomers with excellent elasticity and modulus reaction injection molding formulations available from Upjohn as Isonate 191.

The data in Table VI below was collected using the tests used to collect the data for Examples 1–18 described in subsection 1, above.

TABLE VI

EVALUATION OF RIM FORMULATIONS CONTAINING FATTY POLYOLS

| EXAMPLE | NCO | NCO (WT %) | COPOLYOL B (WT %) | LONG-CHAIN CO-POLYOL E (WT %) | FATTY POLYOL NO. 1 (WT %) | RATIO OF EQUIVALENTS OF FP/SCP/LCP | HARDNESS SHORE D |
|---|---|---|---|---|---|---|---|
| 42 | D | 49   | 2.4 | 18   | 30    | 24/5/1  | 79 |
| 43 | A | 43   | 2.3 | 21   | 34    | 23/5/1  | 76 |
| 44 | E | 42   | 2.3 | 21   | 34    | 23/5/1  | 77 |
| 45 | E | 39   | 0   | 23   | 38    | 24/10/1 | 75 |
| 46 | D | 52.2 | 2.4 | 18.7 | 26.7* | 24/6/1  | 80 |

| EXAMPLE | MAXIMUM TENSILE STRENGTH psi | % ELONGATION AT BREAK | FLEXURAL MODULUS psi | NOTCHED IZOD (ft-lb/in) | HEAT SAG INCHES | $H_2O$ ABSORP. 70° C., % 24 hrs |
|---|---|---|---|---|---|---|
| 42 | 5438 | 50 | 202,500 | 0.8 | 1.0  | 1.8  |
| 43 | 5399 | 50 | 143,500 | 1.4 | 0.7  | 1.45 |
| 44 | 4986 | 30 | 146,400 | 1.2 | 0.5  | 1.4  |
| 45 | 4506 | 50 | 119,000 | 0.7 | 0.5  | 1.5  |
| 46 | 6698 | 20 | 237,200 | —   | 0.65 | 98   |

*Fatty Polyol No. 7 was used in Example 46 in place of Fatty Polyol No. 1.

The data in Table VI illustrates that representative compositions of this invention can be used to form reaction injection molding products with excellent properties. The RIM product of Example 46 possesses a very high degree of hardness, probably due to the higher functionality introduced by ring-opening with TMP, and an unexpectedly high split tear strength. The high split tear strength is unexpected because it is the general experience in the art that increasing the crosslink density tends to reduce the tear strength markedly.

C. URETHANE COATINGS

The fatty polyols can be reacted with a polyisocyanate to form protective polyurethane coatings. These fatty polyols have a variety of advantages in forming polyurethane coatings by reaction with a polyisocyanate curing agent.

The need to reduce volatile organic emissions and the increasing cost of solvents has created a demand for high solids and higher solids coatings. This in turn has created a demand for low viscosity non-volatile compounds which can chemically react with polyfunctional isocyanate crosslinking agents to give protective coatings.

The fatty polyols are just such compounds. They provide high functionality (3 or more reactive hydroxyls for high crosslink density), low viscosity (for high solids application), low volatility (for solids retention during forced drying cycles), good compatibility with other polyols (for use as reactive diluents), and good reactivity with polyfunctional isocyanate prepolymers (for fast complete cure).

In addition, the fatty polyols when used with low viscosity polyfunctional isocyanate crosslinking agents can be air spray applied as high as 100% solids. The fatty polyols contain at least two primary hydroxyls which result in fast reactivity and more complete cure with polyfunctional isocyanate crosslinking agents. Compared to other liquid (100% solids) multifunctional polyols which might be used with polyfunctional isocyanate crosslinking agents, the fatty polyols 1-6 have: no unsaturation which might detract frotm color or gloss retention; no significant amount of ester linkages which might detract from chemical resistance; only enough ether linkages to improve compatibility but not so much as to create water sensitivity problems; no aromatic groups to detract from gloss and color retention; low viscosity compared to other high molecular weight aliphatic triols (e.g. bis(hydroxymethyl)octadecanols); a high molecular weight and a low vapor pressure to insure solids rentention, high crosslink density, good adhesion, flexibility, and film hardness; and water insolubility, therefore, it introduces no water sensitivity into the cured film which results in improved coatings performance.

The fatty polyols can be used in coatings by simply mixing the fatty polyol with a polyisocyanate and applying the resulting mixture onto the surface of a substrate to the desired coating thickness. The coating mixture may be applied in any manner which will achieve the desred thickness, e.g. brush, knife, spray, but in most industrial applications air-spraying is preferred. A volatile organic solvent may be added to the coating mixture to reduce the viscosity thereof and facilitate the air-spray application to a given substrate, however, it is one of the advantages of the present invention that little, if any, solvent is needed in the coating mixture of the present invention.

A catalyst, such as dibutyltin dilaurate, can be added to the coating mixture to catalyze the reaction between the hydroxyl groups of the polyol and the isocynate groups of the polyisocyanate and thereby accelerate the cure of the coating. Other additives such as copolyols, e.g. glycerol or more complex polyols, and pigments, e.g. titanium dioxide, can also be added to vary the properties of the resulting coating.

In addition to Fatty Polyols 1-7, described in Table II, an additional Fatty Polyol was tested in urethane coatings. Fatty Polyol 8 is comprised primarily of 9(10)-(2-hydroxyethoxy)-10(9)-hydroxyoctadecanyl 9(10)-(2-hydroxyethoxy)-10(9)hydroxystearate having a viscosity of 36.9 poise at 25° C. and a hydroxyl equivalent weight of 229.3 g/mole and was prepared by epoxidizing oleyl oleate and ring opening the resulting diepoxide with ethylene glycol.

A fatty polyol comprised primarily of 9(10)-bis(hydroxymethyl)octadecanol (hereinafter $C_{20}$ Triol) which was prepared from oleyl alcohol as disclosed in U.S. Pat. No. 4,304,945, was also tested for comparative purposes.

The Fatty Polyols and the comparative fatty polyol were reacted with three different polyisocyanate compositions:

NCO-F: a biuret prepolymer of 1,6-hexamethylene diisocyanate available from Mobay as Desmodur N-75;
NCO-G: an isocyanate prepolymer of isophorone diisocyanate available from Thorson as IPDI-T-1890;
NCO-H: a urethane prepolymer prepared from toluene diisocyanate and trimethylolpropane available from Mobay as Mondur CB-60.

The polyol was mixed with the isocyanate at the indicated resin solids ratio. Ethoxyethyl acetate was added to the mixture until a 60% solids solution was obtained having the indicated viscosity. This solution was air spray applied to a Bonderite 1000 treated steel panel and allowed to cure at ambient temperature for at least ten (10) days before testing coating properties. The cured coatings exibited the indicated Pencil Hardness to scratch as determined by the procedure of ASTM D 3363-74 and impact flexibility as determined by ASTM D 2794-74. The coating formulations illustrating an embodiment of this invention and the results of the tests of their properties are shown in Table VII. The comparative formulations and the results of the tests of those formulations are shown in Table VIII.

TABLE VIII-continued

| | COMPARATIVE EXAMPLES | | |
|---|---|---|---|
| | 64 A | 64 B | 64 C |
| Polyol/NCO Solids Ratio (wt/wt) | 37.6/62.4 | 31.9/68.1 | 31.9/68.1 |
| Solution Viscosity (CP at 25° C.) | 25 | 40 | 40 |
| Pencil Hardness | F | H | H |
| Impact Flexibility Direct (in.-lb.) | 107 | 50 | 50 |
| Impact Flexibility Reverse (in.-lb.) | 97 | 25 | 25 |

D. URETHANE FOAMS

TABLE VII

| EXAMPLE | 47 | 48 | 49 | 50 | 51 | 52 | 53 | 54 | 55 |
|---|---|---|---|---|---|---|---|---|---|
| Fatty Polyol | FP-1 | FP-1 | FP-1 | FP-2 | FP-2 | FP-2 | FP-3 | FP-3 | FP-3 |
| NCO | NCO-F | NCO-G | NCO-H | NCO-F | NCO-G | NCO-H | NCO-F | NCO-G | NCO-H |
| FP/NCO Solids Ratio (wt/wt) | 43.15/56.85 | 37.20/62.8 | 37.47/62.55 | 47.36/52.64 | 41.25/58.75 | 41.5/58.5 | 50.1/49.9 | 43.9/56.1 | 44.2/55.8 |
| Solution Viscosity (CP at 25° C.) | 25 | 50 | 180 | 25 | 60 | 130 | 25 | 25 | 110 |
| Pencil Hardness | F | HB | F | F | F | F | 2H | B | F |
| Impact Flexibility Direct (in.-lb.) | 160 | 100 | 160 | 160 | 120 | 100 | 160 | 160 | 160 |
| Impact Flexibility Reverse (in.-lb.) | 140 | 140 | 160 | 140 | 160 | 160 | 160 | 160 | 160 |

| EXAMPLE | 56 | 57 | 58 | 59 | 60 | 61 | 62 | 63 | 64 |
|---|---|---|---|---|---|---|---|---|---|
| Fatty Polyol | FP-4 | FP-4 | FP-4 | FP-5 | FP-5 | FP-5 | FP-6 | FP-6 | FP-6 |
| NCO | NCO-F | NCO-G | NCO-H | NCO-F | NCO-G | NCO-H | NCO-F | NCO-G | NCO-H |
| FP/NCO Solids Ratio (wt/wt) | 42.2/57.8 | 36.3/63.7 | 36.5/63.5 | 45.8/54.2 | 39.7/60.3 | 40.0/60.0 | 49.8/50.2 | 43.6/50.2 | 43.9/56.1 |
| Solution Viscosity (CP at 25° C.) | 27.5 | 50 | 160 | 25 | 60 | 160 | 25 | 40 | 130 |
| Pencil Hardness | F | F | F | H | F | F | F | F | F |
| Impact Flexibility Direct (in.-lb.) | 160 | 100 | 160 | 160 | 120 | 160 | 160 | 120 | 160 |
| Impact Flexibility Reverse (in.-lb.) | 160 | 120 | 160 | 140 | 140 | 160 | 140 | 160 | 160 |

TABLE VIII

| | COMPARATIVE EXAMPLES | | |
|---|---|---|---|
| | 64 A | 64 B | 64 C |
| Polyol | $C_{20}$Triol | $C_{20}$Triol | $C_{20}$Triol |
| NCO | NCO-F | NCO-G | NCO-H |

The fatty polyols useful in this invention can be reacted with a polyisocyanate to form urethane foams. These fatty polyols in general yield excellent foams. In particular, the fatty polyols, when used with a co-polyol having a high hydroxyl number, yield urethane foams with excellent rigidity and an isotropicity index close to 1.0 which indicates a rigid foam having almost spherical cells. This is a valuable property in rigid urethane foams, especially those contemplated for use as insulating material.

When preparing rigid polyurethane foams from a polyol and a diisocyanate, it is generally necessary to use a polyol having a hydroxyl number in the range of 400–500, more preferably 450–500. Because Fatty Polyols 1–6 have hydroxyl numbers below this range, a modifying co-polyol is preferably used with these Fatty Polyols such that the polyol mixture will have a hydroxyl number within the ranges noted above. Examples of suitable modifying co-polyols include the alkanediols such as ethylene glycol, alkanetriols such as trimethylolpropane and glycerol, polyether diols derived from alkanediols such as the reaction product of ethylene glycol and alkylene oxides such as ethylene and/or propylene oxide and polyether polyols derived from polyols such as the reaction product of glycol or sucrose with alkylene oxides such as ethylene and/or propylene oxide.

The process of preparing the urethane modified foams generally includes mixing the polyol and isocyanate reactants in the presence of a urethane-forming catalyst and a blowing agent. An example of a suitable urethane-forming catalyst is dibutyltin dilaurate. Suitable blowing agents include the lower fluorocarbons such as trichloromonofluoromethane which when included in the reaction mixture will volatilize from the exotherm of the urethane-forming reaction to produce a cellular structure in the resulting foam.

As indicated above, many of the urethane foams tested exhibited an isotropicity index close to 1.0. The term "isotropicity index" is defined as the ratio of the compressive modulus of the foam in direction parallel to the direction of foam rise to the compressive modulus of the foam in a direction perpendicular to the direction of foam rise. In general, the compressive strength of most commercially available foams is much greater in the direction parallel to the direction of foam rise than the direction perpendicular to the direction of foam rise, such that the isotropicity of most commercial foams is much greater than one.

It has been found that the urethane foams produced from the fatty polyols, particularly those having large amounts of saturated fatty alcohols, a polyisocyanate and a conventional surfactant have a high open cell content. While this may be a drawback in foams used for thermal insulation, it has been found that high open cell content is extremely desirable in foams used for acoustical insulation. Open cell foams also have utility as filters.

Test Methods

Apparent Density: ASTM D-1622-63.
Tumbling Friability: ASTM C-421-71.
The tumbling test was carried out for 10 min. The percent weight loss was calculated by the following equation:

$$\% \text{ weight loss} = \frac{M_1 - M_2}{M_1} \times 100$$

where $M_1$: original weight
$M_2$: final weight
Butler Chimney Test:
A measure of surface flammability (flame spread) was used to measure the percent weight retention of the foam. The specimen sizes employed were $\frac{3}{4} \times \frac{3}{4} \times 10$ inches, and the specimens were burnt in a chimney. The percent weight retention was calculated by using the following equation:

$$\% \text{ weight retention} = \frac{W_2}{W_1} \times 100$$

where
$W_1$: original weight
$W_2$: final weight
Rate of Burning and Extent of Burning: ASTM D-1692-72

Specimens having the sizes of $150 \times 50 \times 13$ mm were burnt in the horizontal position. The specimen laid on a wire mesh was burnt from one end by using a wing burner for 60 seconds, then the specimen was allowed to burn. Burning rate was calculated by the following equation:

$$\text{Burning Rate, mm/sec.} = \frac{125}{\text{time for flame to reach gage mark}}$$

Extent of Burning was calculated from the following equation:
Extent of Burning = 125—(the nearest distance from the flame front to the gage mark)
Smoke Density: ASTM D-2843-70
So-called XP-2 smoke chamber was employed for this test. All the results did not reach 100% light obscuration; therefore, the data were compared by using maximum light obscuration.
Compressive Strength: ASTM D-1621-73
This test was conducted with 200 lbs. weight, cross speed: 0.1 in./min., chart speed 2 in./min. sample size: $2 \times 2 \times 1$ inch. Strength in directions both parallel to foam rise and perpendicular to foam rise were measured.
Dimensional Stability: ASTM D-2126-75:
This test was conducted in a closed oven at a temperature of 70° C. ±2° C., 98% RH and for one day, one week and two weeks respectively. Sample sizes employed were $4 \times 4 \times 1$ inches.
The Dimensional stability rating at 70° C. for 24 hours was determined by the following criteria:
A: no change;
B: small change, equal to the control;
C: large change;
D: unacceptable deformation;
N.A: not available due to shrunk foams.

1. Rigid Urethane Foams from Fatty Polyols and a Polyether Copolyol

The following urethane foams were prepared from the Fatty Polyols 1–6 from NCO-I, bis(isocyanatophenyl)methane available from Mobay as Mondur MR, a sucrose based polyether copolyol (Copolyol-F) available from Dow as Voranol 360, a silicone surfactant (Silicone Surfactant) available from Dow Corning as DC-193, a blowing agent of trichloromonofluoromethane (Blowing Agent), and a urethane catalyst available from Dabco as 8020.

TABLE IX

Rigid Urethane Foams

| EXAMPLE NO. | 67 | 68 | 69 | 70 | 71 | 72 | 73 | 74 | 75 |
|---|---|---|---|---|---|---|---|---|---|
| FORMULATION | | | | | | | | | |
| NCO-I (g) | 46.6 | 46.9 | 47.0 | 44.5 | 44.1 | 43.9 | 43.1 | 42.3 | 41.9 |
| Copolyol-F (g) | 25.9 | 17.4 | 13.1 | 24.8 | 16.4 | 12.2 | 24.0 | 15.7 | 11.7 |
| FP-1 (g) | 24.1 | 32.4 | 36.5 | | | | | | |
| FP-2 (g) | | | | 27.3 | 36.1 | 40.5 | | | |
| FP-3 (g) | | | | | | | 29.5 | 38.6 | 43.1 |
| Equivalent ratio FP/Copolyol | 1.0 | 2.0 | 3.0 | 1.0 | 2.0 | 3.0 | 1.0 | 2.0 | 3.0 |
| Silicone Surfactant (g) | 2.0 | 2.0 | 2.0 | 1.0 | 0.1 | 0.1 | 0.2 | 2.0 | 0.1 |
| Blowing Agent (g) | 18.0 | 18.0 | 18.0 | 22.0 | 22.0 | 22.0 | 25.0 | 25.0 | 25.0 |
| Urethane Catalyst (g) | 1.4 | 1.4 | 1.4 | 2.0 | 1.5 | 1.5 | 1.5 | 1.4 | 2.0 |
| NCO Index | 105 | 105 | 105 | 105 | 105 | 105 | 105 | 105 | 105 |
| REACTIVITY | | | | | | | | | |
| Cream Time (sec.) | 25 | 25 | 25 | 20 | 30 | 23 | 25 | 35 | 20 |
| Rise Time (sec.) | 60 | 65 | 60 | 60 | 70 | 55 | 70 | 75 | 55 |
| Tack Free Time (sec.) | 70 | 75 | 65 | 75 | 100 | 75 | 95 | 135 | 90 |
| FOAM PROPERTIES | | | | | | | | | |
| Density; pcf (kg/m$^3$) | 2.04(32.5) | 2.07(33.1) | 2.01(32.1) | 2.0 | 2.2 | 3.11 | 2.37 | 3.26 | 3.42 |
| Friability; % Wt. Loss | 2.0 | 1.3 | 1.8 | 1.40 | 6.99 | N.A. | 11.36 | N.A. | N.A. |
| Compressive Modulus (Strength); psi | | | | | | | | | |
| parallel | 372.8 | 205.1 | 218.7 | 131.0 | 85.4 | N.A. | 68.7 | N.A. | N.A. |
| perpendicular | 142.0 | 148.2 | 161.9 | 114.2 | 136.6 | N.A. | 70.0 | N.A. | N.A. |
| isotropicity index | 2.62 | 1.38 | 1.35 | 1.15 | 0.63 | N.A. | 0.98 | N.A. | N.A. |
| Dimensional Stability at 70° C. for 24 hours | B | C | C | | | | D | N.A. | N.A. |

| EXAMPLE NO. | 76 | 77 | 78 | 79 | 80 | 81 | 82 | 83 | 84 |
|---|---|---|---|---|---|---|---|---|---|
| FORMULATION | | | | | | | | | |
| NCO-I (g) | 47.2 | 47.7 | 47.9 | 45.3 | 45.1 | 45.1 | 43.2 | 42.5 | 42.1 |
| Copolyol-F (g) | 26.3 | 17.7 | 13.3 | 25.2 | 16.7 | 12.5 | 24.1 | 15.8 | 11.7 |
| FP-4 (g) | 23.2 | 31.3 | 35.3 | | | | | | |
| FP-5 (g) | | | | 26.1 | 34.7 | 39.0 | | | |
| FP-6 (g) | | | | | | | 29.3 | 38.3 | 42.8 |
| Equivalent ratio FP/Copolyol | 1.0 | 2.0 | 3.0 | 1.0 | 2.0 | 3.0 | 1.0 | 2.0 | 3.0 |
| Silicone Surfactant (g) | 2.0 | 2.0 | 2.0 | 2.0 | 2.0 | 2.0 | 1.0 | 2.0 | 2.0 |
| Blowing Agent (g) | 18.0 | 18.0 | 18.0 | 22.0 | 22.0 | 22.0 | 25.0 | 25.0 | 25.0 |
| Urethane catalyst (g) | 1.4 | 1.4 | 1.4 | 1.4 | 1.4 | 1.4 | 2.0 | 1.4 | 1.4 |
| NCO Index | 105 | 105 | 105 | 105 | 105 | 105 | 105 | 105 | 105 |
| REACTIVITY | | | | | | | | | |
| Cream Time (sec.) | 20 | 25 | 20 | 25 | 25 | 25 | 30 | 30 | 23 |
| Rise Time (sec.) | 50 | 50 | 35 | 60 | 60 | 60 | 80 | 80 | 65 |
| Tack Free Time (sec.) | 70 | 60 | 50 | 85 | 85 | 80 | 135 | 110 | 85 |
| FOAM PROPERTIES | | | | | | | | | |
| Density; pcf | 2.05 | 2.05 | 2.18 | 1.87 | 2.14 | 3.29 | 2.07 | 2.3 | 3.5 |
| Friability; % Wt. Loss | 0.12 | 4.87 | 1.71 | 3.64 | 2.65 | N.A. | 5.55 | 3.47 | N.A. |
| Compressive Modulus (Strength); psi | | | | | | | | | |
| parallel | 335.0 | 173.3 | 202.3 | 175.5 | 121.1 | N.A. | 112.2 | 126.1 | N.A. |
| perpendicular | 123.2 | 104.5 | 197.6 | 97.7 | 79.2 | N.A. | 78.2 | 83.0 | N.A. |
| isotropicity index | 2.72 | 1.66 | 1.02 | 1.80 | 1.53 | N.A. | 1.43 | 1.52 | N.A. |
| Dimensional Stability at 70° C. for 24 hours | B | B | C | C | C | N.A. | D | D | N.A. |

2. Rigid Urethane Foams From a Fatty Polyol and Polyalcohols Having Low Molecular Weight In addition, the following foams were prepared using the indicated short chain alkane polyols as the modifying co-polyol rather than the sucrose based polyether polyol of Examples 67–81.

The blended polyols were prepared to have an average OH number of 500.

TABLE X

| EXAMPLE NO. | 82 | 83 | 84 |
|---|---|---|---|
| NCO-I (g) | 50.0 | 50.0 | 50.0 |
| FEP-1 (g) | 34.4 | 32.8 | 31.2 |
| Ethylene glycol (g) | 5.6 | 0 | 0 |
| Propylene glycol (g) | 0 | 7.2 | 0 |
| Glycerine (g) | 0 | 0 | 13.0 |
| Silicone/Surfactant (g) | 1.0 | 1.0 | 1.0 |

TABLE X-continued

| EXAMPLE NO. | 82 | 83 | 84 |
|---|---|---|---|
| Urethane Catalyst | 1.3 | 1.3 | 1.3 |
| Blowing Agent | 23 | 20 | — |
| Cream time (sec.) | 20 | 20 | — |
| Rise time (sec.) | 45 | 35 | — |
| Tack free time (sec.) | 45 | 55 | — |
| Foam density, g/cc | 1.8 | 1.7 | — |

E. URETHANE-MODIFIED POLYISOCYANURATE FOAMS

Urethane-modified polyisocyanurate foams are disclosed in U.S. Pat. No. 3,652,872 and No. 3,931,065. Urethane-modified isocyanurate foams are generally prepared by reacting a polyfunctional isocyanate, and a polyol in less than stoichiometric amounts, i.e. an NCO- /OH equivalent ratio greater than 1.5, in the presence of a fluorocarbon blowing agent, a trimerization catalyst and a surfactant. The trimerization catalyst catalyzes the trimerization reaction of NCO groups to form an isocyanurate ring. Other NCO groups in the polyfunctional isocyanate reactant can react with an OH group from polyol reactants to form a urethane moiety which serves to link the isocyanate rings and thereby form a urethane-modified polyisocyanurate. The blowing agent volatilizes due to the exotherm of the trimerization and urethane-forming reactions and thereby forms a cellular, i.e. foam, product from the polymerizing reactants.

It has been found that the urethane foams produced from the fatty polyols, particularly those having large amounts of saturated fatty alcohols, a polyisocyanate and a conventional surfactant have a high open cell content. While this may be a drawback in foams used for thermal insulation, it has been found that high open cell content is extremely desirable in foams used for acoustical insulation. Open cell foams also have utility as filters.

The following urethane-modified isocyanurate foams were prepared using the same Co-polyol, Silicone Surfactant and Blowing Agent as in Examples 67-81. NCO-J is a polyfunctional polyphenyl isocyanate available from Upjohn as PAPI-135, having an equivalent weight of 133 g./equiv. and an average functionality of about 2.7. A trimerization catalyst, DABCO TMR-2 available from Air Products Co. was also used in the following examples.

EXAMPLES 85-87

A premix of a polyol, a surfactant, a trimerization catalyst and a blowing agent was prepared. A polymeric isocyanate was then poured into the premix which was then vigorously stirred for 10 seconds.

After the foam rise was completed, the foams obtained were post-cured in an oven at about 80° C. overnight.

TABLE XI

| Rigid Isocyanurate Foams | | | |
|---|---|---|---|
| EXAMPLE NO. | 85 | 86 | 87 |
| FORMULATIONS | | | |
| NCO-J (g) | 200.0 | 200.0 | 200.0 |
| NCO/OH Eq. ratio | 5.0 | 10.0 | 15.0 |
| Fatty Polyol 4 (g) | 41.2 | 20.6 | 13.7 |
| Silicone Surfactant (g) | 2.0 | 2.0 | 2.0 |
| Blowing Agent (g) | 38.0 | 38.0 | 38.0 |
| Trimerization Catalyst (g) | 2.0 | 2.0 | 2.0 |
| PROCESSING | | | |
| Cream time (sec.) | 72 | 70 | 66 |
| Rise time (sec.) | 95 | 110 | 105 |
| Tack-free time (sec.) | 95 | 110 | 105 |
| Density (pcf) | 2.12 | 2.16 | 2.09 |
| PROPERTIES | | | |
| Friability (% wt. loss) | 42.2 | 39.5 | 34.0 |
| Smoke Density (Max. % Light Absorbed | 37.0 | 11.6 | 9.4 |
| Butler Chimney (% wt. retain) | 77.5 | 82.5 | 83.5 |
| Extent of Burning (mm) | 36.5 | 24.5 | 21.0 |
| Max. Compressive Strength (psi) | | | |
| parallel | 27.5 | 18.3 | 17.5 |
| perpendicular | 17.5 | 18.1 | 18.5 |
| Isotropicity Index: | 1.60 | 1.00 | 0.95 |
| Flame Penetration (min-sec.) | 38–05 | 24–30 | 38–36 |

Friability data for a urethane-modified isocyanurate foam are very important from the standpoint of practical handling and transportation, because most isocyanurate foams have defects in friability. According to the requirements for transportation in the U.S., the tumbling friability of % weight loss should be less than 30%.

In general, the literature so far has shown that increased NCO/OH ratio leads to increased friability. The data of the control foam, prepared by using CoPolyol F, a conventional sucrose-based polyether polyol (Voranol 360 from Dow), showed this tendency which can be seen in the following table, Table XII.

TABLE XII

| Comparative Rigid Isocyanurate Foams | | | |
|---|---|---|---|
| EXAMPLE NO. | 85A | 86A | 87A |
| FORMULATIONS | | | |
| NCO-J (g) | 200.0 | 200.0 | 200.0 |
| NCO/OH Eq. ratio | 5.0 | 10.0 | 15.0 |
| Voranol 360 (g) | 46.7 | 23.3 | 15.6 |
| Silicone Surfactant (g) | 2.0 | 2.0 | 2.0 |
| Blowing Agent (g) | 46.0 | 46.0 | 46.0 |
| Trimerization Catalyst (g) | 4.0 | 4.0 | 4.0 |
| PROCESSING | | | |
| Cream time (sec.) | 50 | 54 | 55 |
| Rise time (sec.) | 80 | 90 | 100 |
| Tack-free time (sec.) | 80 | 90 | 100 |
| Density (pcf) | 2.0 | 1.84 | 2.12 |
| PROPERTIES | | | |
| Friability (% wt. loss) | 31.0 | 49.0 | 60.0 |
| Smoke Density (Max. % Light Absorbed) | 23.0 | 11.0 | 9.0 |
| Butler Chimney (% wt. retain) | 50.0 | 70.0 | 70.0 |
| Extent of Burning (mm) | 62.0 | 27.0 | 26.5 |

In contrast unexpectedly and surprisingly, Fatty Polyol 4 showed the reverse tendency.

The data in Examples 85-87 teaches that the fatty polyols give better friability of urethane-modified isocyanurate foams without the sacrifice of flame retardance, because higher NCO/OH ratios result in reduced flamability due to the higher content of isocyanurate linkages in the foam.

EXAMPLES 88-103

A series of rigid, filled, urethane-modified isocyanurate foams were prepared from the same isocyanate, surfactant, blowing agent and trimerization catalyst as used in Examples 85-87. The fillers used were sucrose (Filler-1), ⅛" chopped glass fiber (Filler-2), ⅛" milled glass fiber (Filler-3), 1/16" milled glass fiber (Filler-4) (all of the glass fiber materials were silane treated and are available from Owens Corning Fiberglass), a silane-treated calcium metasilicate (Filler-5) available from Malvern Minerals Co. as Wollastonite and alumina trihydrate (Filler-6) available from Great Lakes Minerals Co.

For each Example, a premix of 13.7 g of Fatty Polyol 4, 2.0 g of Silicone Surfactant, 4.4 g of Trimerization Catalyst and 40.0 g. of Blowing Agent was prepared, the fillers were added to the premix, and then 200 g. of NCO-J was poured into the premix. The mixture was then vigorously stirred for 25 seconds. After the foam rise was completed, the resulting foams were post-cured in an oven at about 80° overnight.

TABLE XIII

| FORMULATION AND PROCESSING FOR FILLED FOAMS AT NCO/OH EQUIVALENT RATIO OF 15.0 | | | |
|---|---|---|---|
| EXAMPLE NO. | 88 | 89 | 90 |
| FORMULATION | | | |
| Filler-1 | 2.2 | 11.6 | 24.5 |
| % by wt. of Filler | 1.0 | 5.0 | 10.0 |

TABLE XIII-continued
FORMULATION AND PROCESSING FOR FILLED FOAMS AT NCO/OH EQUIVALENT RATIO OF 15.0

| PROCESSING | | | |
|---|---|---|---|
| Cream time (sec.) | 70 | 75 | 85 |
| Rise time (sec) | 125 | 130 | 165 |
| Tack-free time (sec.) | 125 | 130 | 165 |
| Density (pcf) | 2.07 | 2.28 | 2.26 |
| (kg/m³) | 33.1 | 36.5 | 36.2 |
| Butler Chimney (% Wt. Retained) | 83.0 | 81.7 | 81.9 |
| Friability (% Wt. Loss) | 30.9 | 30.8 | 46.9 |
| Smoke Density (Max. % Light Absorbed) | 10.6 | 11.7 | 8.1 |

| EXAMPLE NO. | 91 | 92 | 93 |
|---|---|---|---|
| FORMULATION | | | |
| Filler-2 (g) | 24.2 | 55.0 | 146.7 |
| Filler-3 (g) | — | — | — |
| % by wt. of Filler | 10.0 | 20.0 | 30.0 |
| PROCESSING | | | |
| Cream time (sec.) | 50 | 50 | 50 |
| Rise time (sec.) | 90 | 90 | 90 |
| Tack-free time (sec.) | 90 | 90 | 90 |
| Density (pcf) | 2.15 | 3.04 | 4.33 |
| (kg/m³) | 34.4 | 48.6 | 69.3 |
| Butler Chimney (% Wt. Retained) | 89.3 | 92.8 | 98.0 |
| Friability (% Wt. Loss) | 46.8 | 25.7 | 14.0 |
| Smoke Density (Max. % Light Absorbed) | 10.6 | 8.8 | 2.9 |

| EXAMPLE NO. | 94 | 95 |
|---|---|---|
| FORMULATION | | |
| Filler-2 (g) | — | — |
| Filler-3 (g) | 24.2 | 55.0 |
| % by wt. of Filler | 10.0 | 20.0 |
| PROCESSING | | |
| Cream time (sec.) | 70 | 70 |
| Rise time (sec.) | 100 | 110 |
| Tack-free time (sec.) | 100 | 110 |
| Density (pcf) | 2.19 | 3.19 |
| (kg/m³) | 35.0 | 51.0 |
| Butler Chimney (% Wt. Retained) | 86.8 | 92.6 |
| Friability (% Wt. Loss) | 38.1 | 32.8 |
| Smoke Density (Max. % Light Absorbed) | 12.1 | 23.5 |

| EXAMPLE NO. | 96 | 97 | 98 |
|---|---|---|---|
| FORMULATION | | | |
| Filler-4 (g) | 24.2 | 55.0 | 146.7 |
| Filler-5 (g) | — | — | — |
| % by wt. of Filler | 10.0 | 20.0 | 30.0 |
| PROCESSING | | | |
| Cream time (sec.) | 65 | 65 | 65 |
| Rise time (sec.) | 110 | 100 | 100 |
| Tack-free time (sec.) | 110 | 100 | 100 |
| Density (pcf) (kg/m³) | 2.26 | 2.51 | 3.55 |
| (kg/m³) | 36.2 | 40.2 | 56.8 |
| Butler Chimney (% Wt. Retained) | 86.0 | 89.3 | 95.7 |
| Friability (% Wt. Loss) | 34.4 | 43.7 | 53.6 |
| Smoke Density (Max. % Light Absorbed) | 23.5 | 15.5 | 5.0 |

| EXAMPLE NO. | 99 | 100 | 101 |
|---|---|---|---|
| FORMULATION | | | |
| Filler-4 (g) | — | — | — |
| Filler-5 (g) | 24.2 | 55.0 | 146.7 |
| % by wt. of Filler | 10.0 | 20.0 | 30.0 |
| PROCESSING | | | |
| Cream time (sec.) | 65 | 65 | 65 |
| Rise time (sec.) | 110 | 110 | 120 |
| Tack-free time (sec.) | 110 | 110 | 120 |
| Density (pcf) (kg/m³) | 2.37 | 2.50 | 3.57 |
| (kg/m³) | 37.9 | 40.0 | 57.1 |
| Butler Chimney (% Wt. Retained) | 86.2 | 89.2 | 92.8 |
| Friability (% Wt. Loss) | 31.3 | 47.9 | 89.7 |
| Smoke Density (Max. % Light Absorbed) | 15.0 | 15.4 | 13.5 |

| EXAMPLE NO. | 102 | 103 |
|---|---|---|
| FORMULATION | | |
| Filler-6 (g) | 11.6 | 24.5 |
| % by wt. of Filler | 5.0 | 10.0 |
| PROCESSING | | |
| Cream time (sec.) | 70 | 70 |
| Rise time (sec.) | 120 | 120 |
| Tack-free time (sec.) | 120 | 120 |
| Density (pcf) (kg/m³) | 2.53 | 2.54 |
| (kg/m³) | 40.5 | 40.6 |
| Butler Chimney (% Wt. Retained) | 87.7 | 88.8 |
| Friability (% Wt. Loss) | 32.1 | 38.7 |
| Smoke Density (Max. % Light Absorbed) | 12.2 | 9.6 |

To summarize, improvement in friability was found in the use of ⅛" chopped and milled glass fibers. Other fillers did not show an improvement in friability. It is interesting to note that ⅛" chopped glass fibers in an amount of 30% of the total foam weight showed less than 20% weight loss in the tumbling friability test. In contrast, inorganic powders, i.e., alumina trihydrate and Wollastonite showed increased friability with the increased amount of fillers.

Some fillers showed better smoke supression effect at over 20% addition of fillers, e.g., ⅛" glass fibers. Sucrose and alumina trihydrate showed a tendency of decreasing smoke density.

The data also shows that increasing the amount of fillers, except sucrose, gave higher % weight retention which suggests higher fire endurance or lower combustibility. The data show also that the best filler to impart higher fire endurance to the foam is ⅛" glass fibers, both chopped and milled.

What is claimed is:

1. A composition useful in preparing polyurethanes comprising a mixture of an organic polyisocyanate and at least one fatty polyol of the formula:

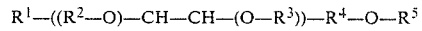

$$R^1-((R^2-O)-CH-CH-(O-R^3))-R^4-O-R^5$$

wherein:

$R^1$ is a monovalent hydrocarbon radical having from 2 to 14 carbon atoms;

$R^2$ and $R^3$ are individually selected from the group of hydrogen, hydroxyl-substituted alkyl radicals, hydroxyl-substituted alkoxyalkyl radicals and hydroxyl-substituted poly(oxyalkylene) radicals, provided that each radical contains from 2 to 32 carbon atoms and from 1 to 9 hydroxyl substituents and, provided further, that at least one of $R^2$ and $R^3$ is other than hydrogen;

$R^4$ is a divalent hydrocarbon radical having from 4 to 14 carbon atoms provided that the sum of the carbon atoms in $R^1$ and $R^4$ must be from 10 to 24; and $R^5$ is selected from the group of hydrogen, hydroxyl-substituted alkyl radicals, hydroxyl-substituted alkoxyalkyl radicals, hydroxyl-substituted poly(oxyalkylene) radicals, provided that each hydroxyl-substituted radical contains from 2 to 32 carbon atoms and from 1 to 9 hydroxyl substituents, and acyl radicals having the structural formula:

$$OC-R^6-((R^7-O)-CH-CH-(O-R^8))-R^9$$

wherein:

$R^6$ is a divalent hydrocarbon radical having from 3 to 13 carbon atoms;

$R^7$ and $R^8$ are individually selected from the group of hydrogen, hydroxyl-substituted alkyl radicals, hydroxyl-substituted alkoxyalkyl radicals and hydroxyl-substituted poly(oxyalkylene) radicals, provided that each radical contains from 2 to 32 carbon atoms and from 1 to 9 hydroxyl substituents and, provided further, that at least one of $R^7$ and $R^8$ is other than hydrogen; and $R^9$ is a monovalent hydrocarbon radical having from 2 to 14 carbon atoms provided that the sum of the carbon atoms in $R^6$ and $R^9$ must be from 9 to 23.

2. A composition in accordance with claim 1 which is substantially free of a salt formed by the neutralization of a strong acid or strong base.

3. A composition in accordance with claim 1 wherein the mixture contains a fatty polyol wherein one of $R^2$ and $R^3$ is hydrogen and one is the residue of ethylene glycol or trimethylolpropane.

4. A composition in accordance with claim 1 wherein the mixture contains a fatty polyol wherein $R^1$ is a straight-chain alkyl group having 8 carbon atoms and $R^4$ is a straight-chain alkylene group having 8 carbon atoms.

5. A composition in accordance with claim 1 wherein the mixture contains a fatty polyol wherein $R^5$ is hydrogen.

6. A composition in accordance with claim 1 wherein the ratio of isocyanate equivalents of the organic polyisocyanate compound to the hydroxyl equivalents of the fatty polyol and any other polyol present in the mixture ranges from about 0.8:1 to about 1.2:1.

7. A composition in accordance with claim 6 wherein the mixture contains a polyol selected from the group of alkane diols having from 2 to 6 aliphatic carbon atoms.

8. A composition in accordance with claim 5 wherein the organic polyisocyanate compound is a polyisocyanate prepolymer or adduct of an organic polyisocyanate compound.

9. A composition in accordance with claim 1 wherein the ratio of isocyanate equivalents of the organic polyisocyanate compound to the hydroxyl equivalents of the fatty polyol and any other polyol present in the mixture ranges from about 1.5:1 to about 30:1.

10. A composition in accordance with claim 9 which further comprises a trimerization catalyst, a surfactant and a blowing agent.

11. A method of using a composition in accordance with claim 1 to form a polyurethane containing material which comprises curing the composition of claim 1.

12. A method in accordance with claim 11 wherein the composition is cured in a mold to produce a polyurethane elastomer.

13. A method in accordance with claim 11 wherein the composition is cured on the surface of a substrate to form a polyurethane coating.

14. A method in accordance with claim 11 wherein the composition is cured in the presence of a urethane catalyst, a surfactant and a blowing agent to form a polyurethane foam.

15. A method in accordance with claim 11 wherein the composition is cured in the presence of a trimerization catalyst, a surfactant and a blowing agent to form a polyurethane modified polyisocyanurate foam.

16. The cured product of claim 11.

17. The cured product of claim 12.

18. The cured product of claim 13.

19. The cured product of claim 14.

20. The cured product of claim 15.

* * * * *